Aug. 18, 1931.  A. N. MANTERIS  1,819,960
BUTTER DISPENSING MACHINE
Filed Feb. 26, 1931   2 Sheets-Sheet 1
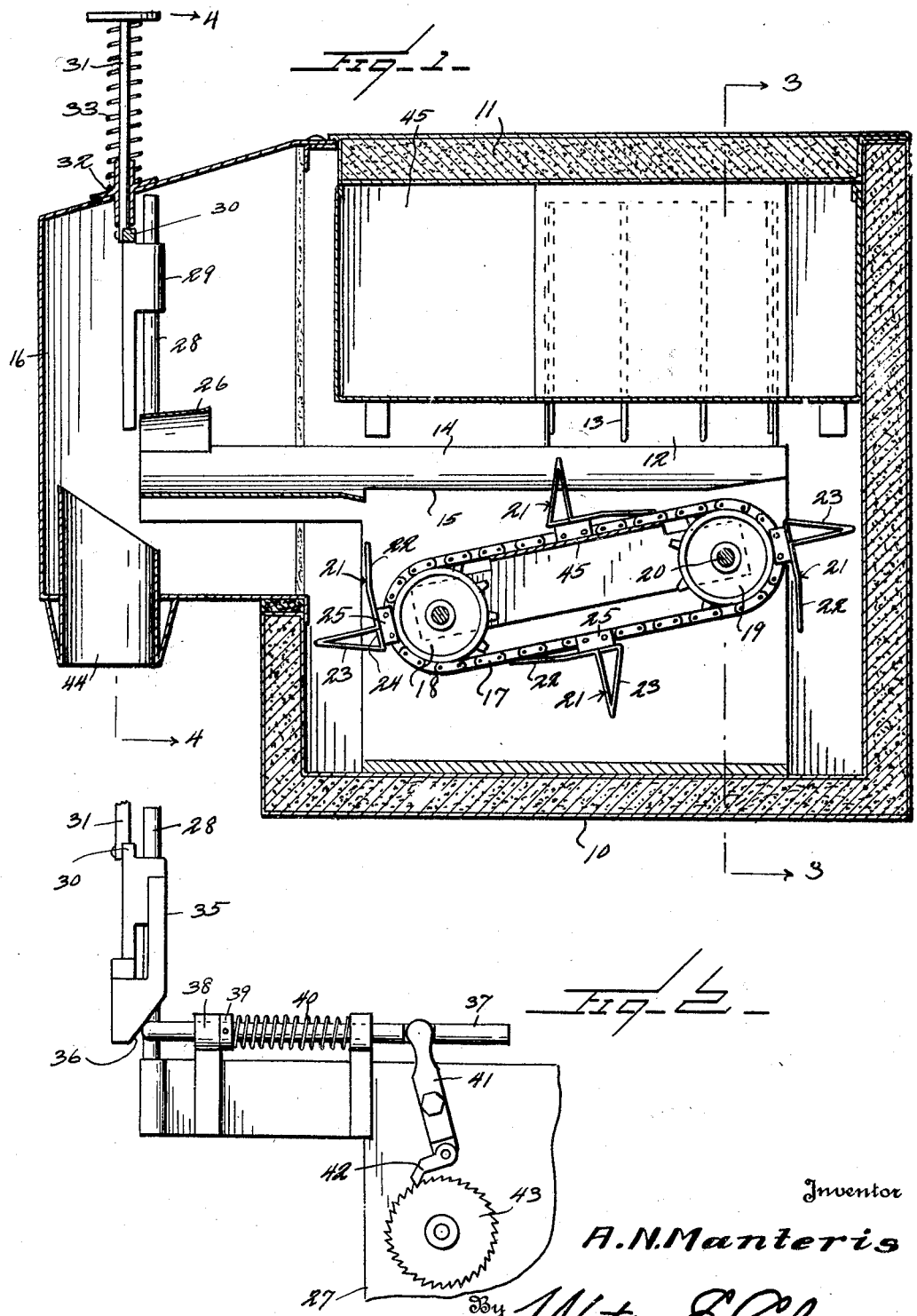
Inventor
A. N. Manteris
By Watson E. Coleman
Attorney Aug. 18, 1931.  A. N. MANTERIS  1,819,960
BUTTER DISPENSING MACHINE
Filed Feb. 26, 1931  2 Sheets-Sheet 2
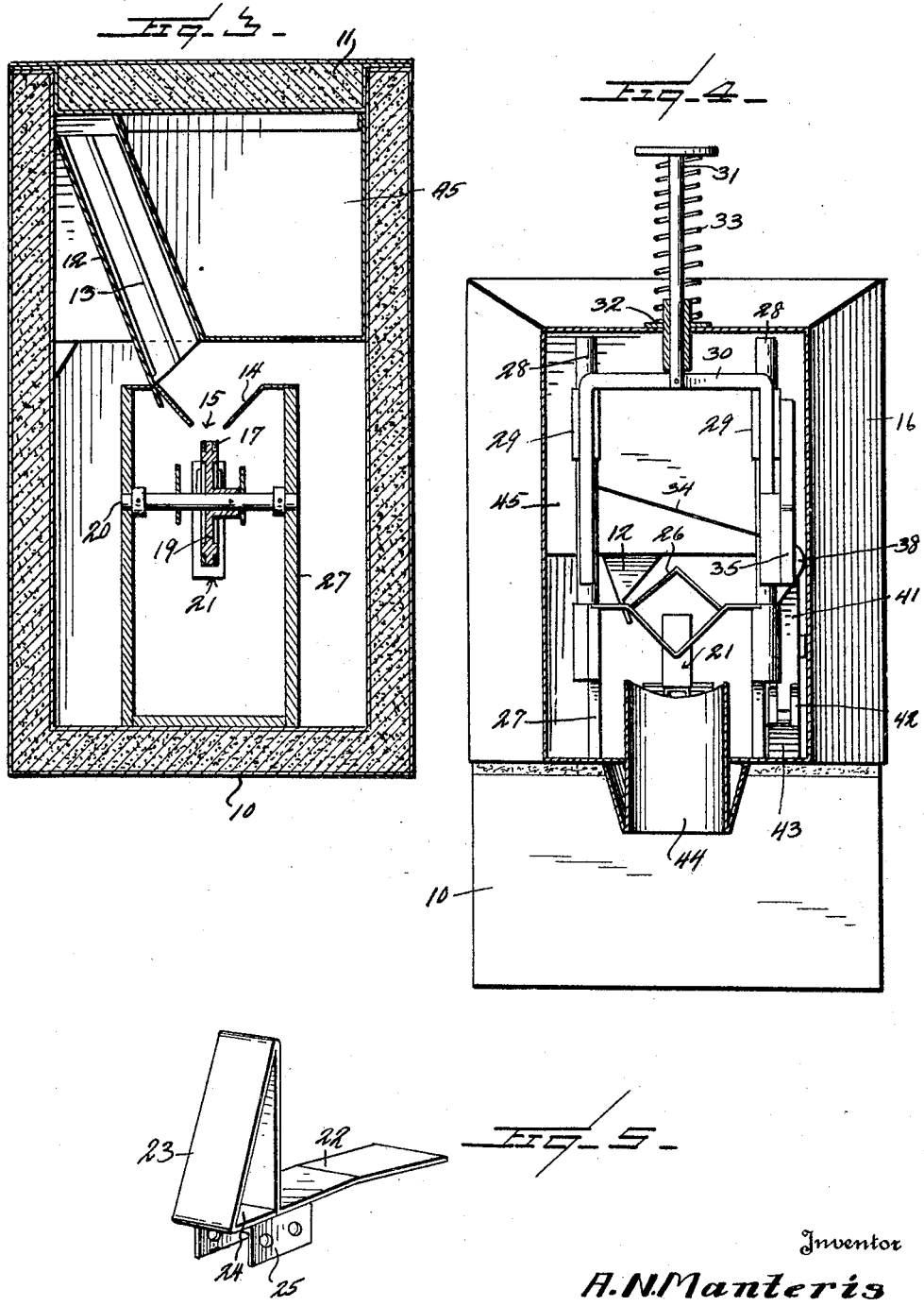

Patented Aug. 18, 1931

1,819,960

UNITED STATES PATENT OFFICE

ARTHUR N. MANTERIS, OF BATON ROUGE, LOUISIANA

BUTTER DISPENSING MACHINE

Application filed February 26, 1931. Serial No. 518,534.

This invention relates to means for cutting butter in the form of blocks into slices and the general object is to provide a device of this character in which these elongated blocks of butter may be fed one by one to a carrier which in turn will automatically carry them to a slicer and to provide means for keeping the butter cool while in the machine.

A further object is to provide mechanism of this character which is very simple, which may be cheaply made and which has been found thoroughly effective in actual practice.

A further object is to provide means whereby the butter is kept enclosed until the slicer operates to cut off a pat of butter and to provide means for holding ice in contiguity with the butter and carrying off the water dripping from the melted ice.

Other objects will appear in the course of the following description.

My invention is illustrated in the accompanying drawings, wherein:—

Figure 1 is a vertical sectional view through a butter dispensing apparatus constructed in accordance with my invention;

Figure 2 is a fragmentary side elevation of a portion of the slide carrying the cutting knife and the cam mechanism for giving a step by step motion to the carrier;

Figure 3 is a section on the line 3—3 of Figure 1;

Figure 4 is a section on the line 4—4 of Figure 1;

Figure 5 is a fragmentary perspective of one of the abutments on the endless carrier.

In these drawings, 10 designates an outer casing which may be of any suitable construction and which is preferably formed of two walls having an intermediate filling of insulating material between the walls. The upper end of the casing is provided with a cover 11 which is normally kept closed. Extending downward and inward through the casing is a chute 12 having longitudinally extending rails 13. This chute has a width equivalent to the length of a block of butter and a depth such that a number of bars may be disposed one on top of the other.

This chute discharges on to a longitudinally extending trough 14 which is longitudinally slotted at 15 for a portion of its length. The casing is formed with a projecting portion 16 into which this trough extends.

Disposed below the trough 14 is an endless element 17 illustrated as a sprocket chain passing over forward and rear sprocket wheels 18 and 19 mounted upon shafts 20. The sprocket chain 17 carries upon it a plurality of abutments 21, each abutment comprising an approximately right angular strip 22. This strip is extended downward as at 23 to form the forward face of the abutment and is then extended inward as at 24 and provided with the ears 25 whereby the strip is attached to the chain 17. It will be seen from Figure 1 that the upper flight of the chain 17 extends forward and downward so that as the chain moves through its endless path, each abutment is carried upward and then downward and forward so that eventually the upper end of each abutment leaves the slot 15 and moves downward to the lower flight of the chain.

At the forward end of the trough 14, there is an upwardly extending bridging portion 26 slightly flared at its rear end. The trough is supported by the longitudinally extending frame 27, which frame also supports the shafts 20. This frame at its forward end carries the vertically extending guides 28 and mounted within these guides are the sliding sleeves 29. Connected to these sliding sleeves are the downwardly extending legs of an approximately U-shaped yoke 30 to the cross bar of which a plunger 31 is attached, this plunger extending up through a sleeve 32 formed in the outer casing of the projecting portion 16. A spring 33 surrounds the plunger and bears against this sleeve and urges the plunger upward. Attached to the two legs of the member 30 is the downwardly and transversely extending cutting wire 34 whose path of movement is directly in front of the portion 26.

Attached to the slide 30 for movement therewith is a cam 35 having a downwardly and forwardly inclined cam face 36. For the purpose of giving a step by step motion to the endless carrier 17 upon each depression of the cutting or slicing knife, I provide a longitudinally reciprocatable rod 37 mounted in guides 38 attached to the frame of the machine. This rod carries a collar 39 and a spring 40 engaging between one of these guides and this collar forces the rod 37 with its rounded nose against the beveled lower end of the cam 35. The rod is pivoted to a lever 41 pivotally mounted upon the frame of the machine and carrying at its lower end the pawls 42, one slightly shorter than the other so that the pawls will engage different teeth. It will be obvious now that when the knife is depressed by the plunger, the cam face 36 will cause a rearward movement of the rod 37 which will cause a forward movement of the ratchet wheel 43 which is mounted upon the forward shaft 20 and that upon an upward movement of the cam 35, the spring 40 will urge the rod 36 forward, thus retracting the pawls 42 over the faces of the teeth on the ratchet wheel. The thickness of the slice of butter cut off by this machine will, of course, depend upon the length of the cam face 36 above its point of contact with the rod.

The lower end of the outwardly projecting portion 16 of the casing is provided with a downwardly opening spout 44 through which the slices of butter are successively discharged, this spout being thus supported above the level of the table or stand upon which the dispenser is placed so that a plate may be disposed beneath the spout to catch the butter.

It will be noted that the butter does not come in contact with the chain 17 but only with the abutments, which are all highly polished, metal and, of course, kept particularly clean.

Disposed in the top of the case 10 and surrounding the chute 12 is an ice receptacle 45. This ice receptacle, it will be seen, is at all times disposed to closely surround the butter which is passing down the chute 12 and also is disposed immediately above the trough 14 so that the butter while not in contact with the ice is kept in a cold atmosphere. The ice pan is not provided with any drainage opening so that as the ice melts, the water is left within the ice pan, but this ice pan may be readily removed at any time for discharging any undue amount of water which may so gather.

The operation of this mechanism will be obvious from what has gone before. It will be noted that the upper flight of the chain 17 is supported by a plate 45 to prevent any sagging of the chain. A butter dispenser of this character has been found thoroughly effective in actual practice, may be cheaply made, can be made relatively compact and is of such simple construction that it may be operated by a child without any chance of injuring the mechanism.

While I have illustrated certain details of construction and arrangements of parts, I do not wish to be limited thereto as obviously these details might be changed without departing from the spirit of the invention as defined in the appended claims.

It will be seen that I have provided a magazine which will hold in storage a sufficient quantity of iced butter to serve a large number of meals without interruption and in which the butter can be sliced or dispensed as needed, doing away with the necessity of slicing the butter before hand and then either having the butter melt or disposing the butter in dishes on ice. It will further be seen that I have provided a machine in which the butter can be served with the least possible exposure to dust, dirt or contamination by bacteria. Furthermore, the device can be readily opened for sterilizing the mechanism. The device is compact and thoroughly effective in actual use.

I claim:—

1. A butter dispensing machine of the character described, comprising an outer casing, a downwardly inclined chute disposed within the outer casing and adapted to contain blocks of butter disposed transversely of the chute, a trough extending at right angles to the chute and upon which the chute discharges, an endless element extending along the bottom of the trough and having upwardly extending pairs of lugs, spaced apart the length of a block of butter, a vertically operating knife having an exterior handle mounted upon the machine, the knife operating transversely of the end of the trough, and means for giving a movement to the endless element equal to the thickness of one slice of butter upon each depression of the knife.

2. A butter dispensing machine of the character described, comprising an outer casing, a downwardly inclined chute disposed within the outer casing and adapted to contain superposed blocks of butter disposed transversely of the chute, a trough extending at right angles to the chute and upon which the chute discharges, the trough being approximately V-shaped in cross section, the trough for a distance being formed with a longitudinally extending slot, an endless element mounted below the trough and having its upper flight extending downward and forward from the rear end of the trough, outwardly projecting abutments mounted upon the endless element and spaced from each other a distance approximately equal to the length of a block of butter, a vertically depressible plunger mounted upon the casing and carrying a knife moving across the extreme end of the trough, and means for giving a step by step movement to said endless element upon each depression of the plunger.

3. A butter dispensing machine of the character described, comprising an outer casing, a downwardly inclined chute disposed within the outer casing and adapted to contain superposed blocks of butter disposed transversely of the chute, a trough extending at right angles to the chute and upon which the chute discharges, the trough being approximately V-shaped in cross section, the trough for a distance being formed with a longitudinally extending slot, an endless element mounted below the trough and having its upper flight extending downward and forward from the rear end of the trough, outwardly projecting abutments mounted upon the endless element and spaced from each other a distance approximately equal to the length of a block of butter, a vertically depressible plunger mounted upon the casing and carrying a knife moving across the extreme end of the trough, and means for giving a step by step movement to said endless element upon each depression of the plunger, comprising a cam carried by said plunger, a longitudinally reciprocatable rod resiliently urged against the cam, wheels carrying said endless elements, one of said wheels having a shaft, a ratchet wheel mounted upon said shaft, a lever pivoted intermediate its ends and at its upper end connected to said rod and a pawl carried by the lower end of said lever and engaged with said ratchet wheel.

4. A butter dispensing machine of the character described, comprising an outer casing having a forwardly projecting portion, the bottom of which is above the bottom of the casing, a chute disposed within the casing and discharging downward and centrally of the casing, a longitudinally extending trough approximately V-shaped in cross section and extending longitudinally through the casing and terminating in said extension, the chute discharging onto said trough, the trough being longitudinally slotted for a portion of its length at its rear end, upwardly extending guides supported at the forward end of the trough on each side thereof, a plunger mounted upon said guides for vertical movement and having a plunger handle extending out of the casing, a spring urging said plunger upward, a cutting wire carried by said plunger and moving across the end of the trough, a discharge spout disposed below the end of the trough, and means for moving cakes of butter along the trough comprising spaced sprocket wheels disposed below the middle of the trough at the rear thereof, an endless chain mounted upon the sprocket wheels, outwardly extending abutments mounted upon the endless chain and extending up into the slot of the trough, the upper flight of the chain being disposed on an inclination downward and forward whereby the abutments will gradually be withdrawn from the trough as each abutment moves downward in its upper flight, and means actuated on each depression of the plunger giving a one step movement to the endless chain equal to the thickness of the pat of butter to be dispensed said movement occurring before the cutting wire impinges on the bar of butter.

5. A butter dispenser of the character described, including a longitudinally extending approximately V-shaped trough, means for discharging bars of butter into said trough, the trough being slotted for a distance from its rear end, a vertically slidable cutter operating across the face of the trough, a plunger for operating said cutter, means resiliently urging the plunger and cutter upward, a pair of sprocket wheels mounted beneath the rear end of the trough, an endless chain carried by said sprocket wheels and having abutments projecting therefrom, the abutments being spaced from each other a distance equal to the length of a bar of butter, a ratchet wheel operatively connected to one of said sprocket wheels to rotate therewith, a longitudinally reciprocatable rod having its forward end disposed adjacent to the path of movement of the cutter, a spring urging said rod forward, a pawl mechanism engaged by said rod and engaging said ratchet wheel and a cam carried by said cutter, the cam having an upwardly and rearwardly extending face and then extending straight upward, the upwardly and rearwardly extending face of the cam being disposed below the cutter whereby as the cutter descends to cause a forward movement of the endless element prior to the engagement of the cutter with the bar of butter.

In testimony whereof I hereunto affix my signature.

ARTHUR N. MANTERIS.